2,918,490
Patented Dec. 22, 1959

2,918,490

1,4a-DIMETHYL-6-ACYLOXYPERHYDROPHENAN-THRENE-1-CARBOXYLIC ACID AND DERIVATIVES

Roy H. Bible, Jr., Morton Grove, and Willard M. Hoehn, Wilmette, Ill., assignors to G. D. Searle & Co., Chicago, Ill., a corporation of Delaware No Drawing. Application June 16, 1958
Serial No. 742,058

6 Claims. (Cl. 260—468.5)

The present invention relates to a new group of esters of resin acid derivatives and, more particularly, to 1,4a-dimethyl-6-acyloxyperhydrophenanthrene - 1 - carboxylic acid and their derivatives. The compounds which constitute this invention can be represented by the general structural formula

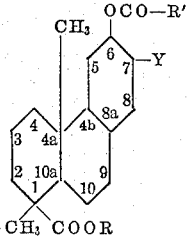

wherein R is hydrogen or a lower alkyl group, wherein R' is a hydrocarbon radical preferably of less than 7 carbon atoms, and wherein Y is hydrogen or a lower alkyl radical.

In the foregoing structural formula the radicals R, Y, and R' can represent such lower alkyl radicals as methyl, ethyl, straight-chain and branched propyl, butyl, amyl, and hexyl. The radical R' can also represent a phenyl, cyclopentyl or cyclohexyl radical.

The esters of this invention are valuable anti-inflammatory agents. They resemble phenylbutazone in their effect on inflammatory local edema. In this respect they are quite unlike the corresponding 6-hydroxy compounds which are inactive in this category.

The following examples illustrate in detail some of the procedures used for practicing this invention and the products produced thereby. However, the invention is not to be construed as limited in spirit or in scope by the details set forth. In these examples vacuum distillation pressures are given in millimeters of mercury and relative amounts of materials in parts by weight.

*Example 1*

A mixture of 50 parts of podocarpic acid, 1.5 parts of platinic oxide, and 250 parts of glacial acetic acid is shaken at 80° C. in an atmosphere of hydrogen under 55 atmospheres' pressure until hydrogenation ceases. The catalyst is removed by filtration, and the acetic acid is stripped under reduced pressure. The glossy residue is refluxed for an hour with a mixture of 50 parts of potassium hydroxide, 200 parts of methanol, and 50 parts of water. The mixture is cooled and then acidified with 10% hydrochloric acid. An oil separates which solidifies on standing. This solid is collected and repeatedly recrystallized from aqueous isopropanol. The 1,4a-dimethyl-6-hydroxyperhydrophenanthrene-1-carboxylic acid is obtained in the form of transparent platelets which melt at about 234–235.2° C. The compound has no appreciable absorption in the ultraviolet range from 250–300 millimicrons. The specific optical rotation is +23° when determined in a 1% absolute ethanol solution.

A mixture of 25 parts of this acid, 50 parts of acetic anhydride, and 0.03 part of concentrated hydrochloric acid is heated and stirred at 80° C. for 30 minutes. This reaction mixture is then added to 400 parts of hot water with stirring and the mixture is allowed to stand for an hour. The resulting solid is collected on a filter, washed with water, and then recrystallized from aqueous methanol to yield 1,4a-dimethyl-6-acetoxyperhydrophenanthrene-1-carboxylic acid which melts at about 134.5–136° C. It has the structural formula

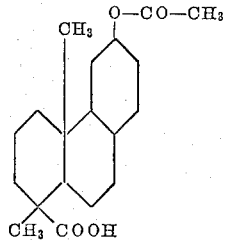

*Example 2*

To a solution of 50 parts of 1,4a-dimethyl-6-oxoperhydrophenanthrene-1-carboxylic acid in 2500 parts of n-propanol is added a total of 250 parts of sodium in small portions. The reaction mixture is maintained at reflux during this addition and for 30 additional minutes. The mixture is then diluted cautiously with 3800 parts of methanol and, after all of the sodium has reacted, with 1200 parts of water. The mixture is then acidified with 10% hydrochloric acid, and the white precipitate is collected, washed with water, and recrystallized from aqueous methanol to yield the 6-epimer of the 1,4a-dimethyl-6-hydroxyperhydrophenanthrene-1-carboxylic acid of the preceding example.

A mixture of 25 parts of this acid, 50 parts of acetic anhydride, and 0.03 part of concentrated hydrochloric acid is heated and stirred at 80° C. for 30 minutes and then poured into 400 parts of hot water. After standing for an hour, the mixture is extracted with ether. The ether extract is washed with water and the washed ether solution is dried over anhydrous sodium sulfate. After removal of the drying agent the solvent is distilled to yield the acetate as a light yellow glass. Further purification is achieved by vacuum distillation in a short path apparatus at 192° C. and 0.07 mm. pressure. The ester is the 6-epimer of the product of the preceding example.

*Example 3*

A solution of 75 parts of 1,4a-dimethyl-6-hydroxyperhydrophenanthrene-1-carboxylic acid, prepared as in Example 1, 150 parts of isobutyric anhydride, and 0.1 part of concentrated hydrochloric acid is heated and stirred at 80° C. for 30 minutes and then poured into 1200 parts of agitated hot water. After standing for an hour, the mixture is extracted with ether. The ether extract is washed with water, dried over anhydrous sodium sulfate, filtered and concentrated under vacuum. The residue is then subjected to short path distillation at 188° C. and 0.03 mm. pressure to yield 1,4a-dimethyl-6-isobutyroxyperhydrophenanthrene-1-carboxylic acid.

*Example 4*

A solution of 5 parts of 1,4a-dimethyl-6-hydroxyperhydrophenanthrene-1-carboxylic acid, prepared as in Example 1, and 6 parts of freshly prepared benzoyl chloride in 25 parts of pyridine is allowed to stand at room temperature for 5 hours, cooled and added to an agitated solution of 1200 parts of 1% sodium bicarbonate. The resulting mixture is allowed to stand for 15 minutes and then extracted with ether. The ether extract is washed first with a 1% sodium bicarbonate solution and then with water to neutrality, dried over anhydrous sodium sulfate, filtered and evaporated to yield 1,4a-dimethyl-6-benzoyloxyperhydrophenanthrene-1-carboxylic acid as a light yellow glass. The infrared absorption spectrum shows a broad band at 5.9 microns and maxima at 7.9 and 9.0 microns.

Example 5

A solution of 4 parts of 1,4a-dimethyl-6-acetoxyperhydrophenanthrene-1-carboxylic acid, prepared as in Example 1, in 50 parts of methanol is rendered slightly basic by the addition of 10% sodium hydroxide. To this solution are added 2 parts of dimethyl sulfate. The resulting mixture is heated for 5 minutes at 70° C., cooled, and again rendered slightly basic by addition of 10% aqueous sodium hydroxide solution. The entire mixture is then extracted with ether. The ether extract is washed first with 10% aqueous sodium hydroxide and then with water to neutrality. The ether solution is dried over anhydrous sodium sulfate and then concentrated under vacuum to yield methyl 1,4a-dimethyl-6-acetoxyperhydrophenanthrene-1-carboxylate, which, recrystallized from aqueous methanol, melts at about 82–84° C.

Example 6

A solution of 4 parts of 1,4a-dimethyl-6-acetoxyperhydrophenanthrene-1-carboxylic acid, as prepared in Example 1, in 50 parts of ethanol is rendered slightly basic by the addition of 10% potassium hydroxide, and then treated with 2 parts of diethyl sulfate. After heating for 5 minutes at 70° C. the mixture is cooled and and again rendered slightly basic by addition of 10% potassium hydroxide. The entire mixture is then extracted with ether and the ether extract is washed first with 10% sodium hydroxide and then with water until the washings are neutral. It is then dried over anhydrous sodium sulfate, filtered and concentrated under vacuum, and the residue is submitted to short path distillation at about 190° C. and 0.03 mm. pressure to yield ethyl 1,4a-dimethyl-6-acetoxyperhydrophenanthrene-1-carboxylate.

Example 7

Pyridine hydrochloride (250 parts) is placed in a round-bottomed flask and a distillation is carried out until the vapor temperature reaches about 215° C. The forerun which is collected in this manner is discarded, and 20 parts of methyl O-methyl-7-acetylpodocarpate (methyl - 1,4a - dimethyl - 6 methoxy - 7 - acetyl - 1,2, 3,4,4a,9,10a - octahydrophenanthrene - 1 - carboxylate) is added to the pyridine hydrochloride remaining in the distillation flask. This mixture is heated under partial reflux for 1 hour in such a manner that excess pyridine is allowed to escape from the reaction vessel. The mixture is then cooled and diluted to several times its volume with water. The precipitated product is collected on a filter and washed with a small quantity of dilute hydrochloric acid and then with copious amounts of water. When this reddish-brown solid is purified by sublimation followed by recrystallization from aqueous methanol, there are obtained well-formed crystals of 7-acetylpodocarpic acid melting at 213.5–216° C.

7-acetylpodocarpic acid is hydrogenated by the following procedure. A mixture of 25 parts of 7-acetylpodocarpic acid, 130 parts of acetic acid, and 2.5 parts of 5% rhodium on alumina catalyst is placed in a medium- or high-pressure reaction vessel and subjected to a hydrogen pressure of about 1000 pounds per square inch at a temperature of about 70–80° C. As the hydrogen is consumed and the pressure drops, periodic refills of hydrogen are made to restore the pressure to about 1000 pounds per square inch. After 7 hours, the catalyst is removed by filtration of the cooled mixture. A fresh portion of 2.5 parts of 5% rhodium on alumina catalyst is added to the filtrate, and hydrogenation under the same conditions is continued for an additional 3 hours, or until the consumption of hydrogen becomes very slow. (When a test portion of the reaction mixture is filtered and brought to dryness, the residue should not give more than a trace amount of a 2,4-dinitrophenylhydrazone; if a substantial quantity of such a ketone derivative is obtained, the hydrogenation should be repeated until the test is essentially negative.) The reaction mixture is filtered, and the filtrate is brought to dryness by vaporization of the acetic acid. The residue, which is an almost colorless glass, is dissolved in a small quantity of benzene, and the solution is poured on a chromatography column prepared from 1700 parts of silica. The column is eluted with benzene and with mixtures of benzene and ethyl acetate containing gradually increasing proportions of ethyl acetate. The principal product of the reaction commonly amounts to about 10 to 12 parts, and can be eluted from the column at a satisfactory rate with a 5 volume percent solution of ethyl acetate in benzene. This principal product appears after other cyrstalline fractions are eluted from the column. After crystallizations from aqueous methanol, the principal product melts at about 177–179.5° C. It is 1, 4a - dimethyl - 6 - hydroxy - 7 - ethylperhydrophenanthrene-1-carboxylic acid.

A mixture of 25 parts of this acid, 50 parts of acetic anhydride, and 0.03 part of concentrated hydrochloric acid is stirred and heated at 80° C. for 30 minutes and then poured into 400 parts of agitated hot water. After standing for an hour the mixture is extracted with ether. This extract is washed with water, dried over anhydrous calcium sulfate, filtered and concentrated under vacuum to yield a light amber glass which is subjected to short path distillation at 190° C. and 0.03 mm. pressure to yield 1,4a - dimethyl - 6 - acetoxy-7-ethylperhydrophenanthrene-1-carboxylic acid of the structural formula

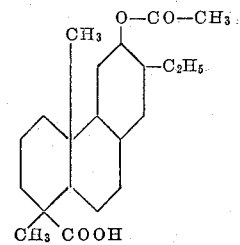

Example 8

A stirred mixture of 302.4 parts of methyl O-methylpodocarpate and 1100 parts of chlorobenzene is maintained at about 10° C. and treated by the gradual addition of 273 parts of aluminum chloride. The mixture is stirred for 10 minutes after the addition of the aluminum chloride has been completed, and then there is gradually added a solution of 185 parts of propionyl chloride in 155 parts of chlorobenzene. The stirred reaction mixture is maintained at about 10–15° C. during this period of addition and for 3 hours thereafter, after which the reaction mixture is allowed to stand at room temperature for 16 hours. It is then poured into 1500 parts of ice water containing 210 parts of concentrated hydrochloric acid. The chlorobenzene is removed by distillation with steam, and the residual aqueous suspension is chilled until crystallization is complete. The solid product is collected and purified by repeated recrystallization from methanol to yield methyl O-methyl-7-propionylpodocarpate melting at 102–103° C.

To a stirred mixture of 8 parts of aluminum chloride in 110 parts of chlorobenzene there is added a solution of 10 parts of methyl O-methyl-7-propionylpodocarpate in 55 parts of chlorobenzene. Stirring is continued and the mixture is maintained at about 80° C. for an additional hour, after which it is cooled and poured into ice-water. Dilute hydrochloric acid and benzene washings of the reaction vessel are added, and the organic solvents are removed by distillation under reduced pressure. The product remaining is then separated and washed by decantation with several portions of water. Purification by recrystallization from aqueous methanol then affords methyl 7-propionylpodocarpate melting at 98–99.5° C.

Methyl 7-propionylpodocarpate (3 parts) is dissolved by stirring it with 28 parts of concentrated sulfuric acid for about 10 minutes. The solution is then cautiously poured into 75 parts of water, and the resulting suspension is chilled and filtered. The solid product is washed with water and then recrystallized from aqueous methanol to yield 7-propionylpodocarpic acid melting at 145–147° C.

Hydrogenation of this acid, according to the procedure of the preceding example, yields 1,4a-dimethyl-6-hydroxy-7-propylperhydrophenanthrene-1-carboxylic acid.

An agitated mixture of 50 parts of this acid, 100 parts propionic anhydride and 0.06 part of concentrated hydrochloric acid is heated at 80° C. for 40 minutes and then poured into 1000 parts of hot water. After standing for an hour, the mixture is extracted with ether and the ether extract is washed with water, dried over anhydrous sodium sulfate, filtered, and concentrated. The residue is subjected to short path distillation at about 195° C. and 0.03 mm. pressure, to yield 1,4a-dimethyl-6-propionoxy-7-propylperhydrophenanthrene-1-carboxylic acid as a light yellowish glass.

What is claimed is:
1. A compound of the formula

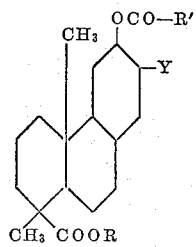

wherein R and Y are members of the class consisting of hydrogen and lower alkyl radicals, and wherein R' is a member of the class consisting of phenyl and lower alkyl radicals.

2. A compound of the formula

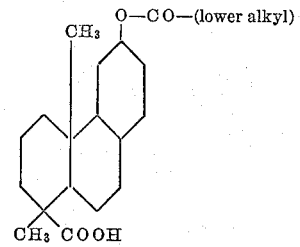

3. 1,4a - dimethyl - 6 - acetoxyperhydrophenanthrene-1-carboxylic acid.

4. A compound of the formula

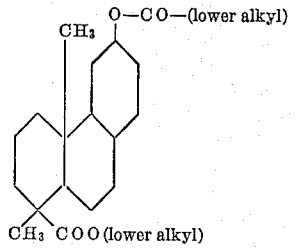

5. Methyl 1,4a - dimethyl - 6 - acetoxyperhydrophenanthrene-1-carboxylate.

6. 1,4a - dimethyl - 6 - isobutyroxyperhydrophenanthrene-1-carboxylic acid.

References Cited in the file of this patent
UNITED STATES PATENTS
2,796,431    Bible et al. _____ June 18, 1957

OTHER REFERENCES
Heer et al.: Helv. Chim. Acta, 30, 787 (1947).
King et al.: J. Chem. Soc. (London) (1953), 4165.